United States Patent
Wada et al.

(10) Patent No.: US 9,959,977 B2
(45) Date of Patent: May 1, 2018

(54) ELECTROLYSIS SOLUTION FOR ELECTROLYTIC CAPACITOR, AND ELECTROLYTIC CAPACITOR

(71) Applicant: Carlit Holdings Co., Ltd., Tokyo (JP)

(72) Inventors: Naoto Wada, Gunma (JP); Kazuyuki Kanemoto, Gunma (JP)

(73) Assignee: Carlit Holdings Co., Ltd., Tokyo (JP)

( * ) Notice: Subject to any disclaimer, the term of this patent is extended or adjusted under 35 U.S.C. 154(b) by 199 days.

(21) Appl. No.: 14/901,330

(22) PCT Filed: Jun. 25, 2014

(86) PCT No.: PCT/JP2014/066862
§ 371 (c)(1),
(2) Date: Dec. 28, 2015

(87) PCT Pub. No.: WO2014/208607
PCT Pub. Date: Dec. 31, 2014

(65) Prior Publication Data
US 2016/0148756 A1    May 26, 2016

(30) Foreign Application Priority Data

Jun. 28, 2013  (JP) .................................. 2013-135971

(51) Int. Cl.
*H01G 9/035*    (2006.01)
*H01G 11/62*    (2013.01)
*H01G 11/64*    (2013.01)

(52) U.S. Cl.
CPC ............. *H01G 9/035* (2013.01); *H01G 11/62* (2013.01); *H01G 11/64* (2013.01)

(58) Field of Classification Search
CPC ......... H01G 9/035; H01G 11/62; H01G 11/64
See application file for complete search history.

(56) References Cited

U.S. PATENT DOCUMENTS

| | | | | |
|---|---|---|---|---|
| 6,493,211 B1 * | 12/2002 | Sugiyama | ............... | H01G 11/58 252/62.2 |
| 9,536,674 B2 * | 1/2017 | Takeuchi | ............... | H01G 9/042 |

FOREIGN PATENT DOCUMENTS

| | | | |
|---|---|---|---|
| CN | 101183728 A | | 5/2008 |
| CN | 101326599 A | | 12/2008 |
| JP | 2002-064036 A | | 2/2002 |
| JP | 2002-075796 A | | 3/2002 |
| JP | 2004-281106 A | | 10/2004 |
| JP | 2004-315976 A | | 11/2004 |
| JP | 2006-12984 | * | 1/2006 |
| JP | 2006-012984 A | | 1/2006 |
| JP | 2011-195613 A | | 10/2011 |
| WO | 2007066822 A1 | | 6/2007 |
| WO | WO 2014/051129 | * | 4/2014 |

OTHER PUBLICATIONS

Translation for JP 2006-12984, Jan. 12, 2006.*

* cited by examiner

*Primary Examiner* — Carol Melissa Koslow
(74) *Attorney, Agent, or Firm* — Loginov & Associates; William A. Loginov

(57) ABSTRACT

Provided is an electrolysis solution for an electrolytic capacitor, having high spark voltage and excellent electric conductivity and heat resistance to spark voltage, and an electrolytic capacitor using the electrolysis solution. An electrolysis solution for an electrolytic capacitor including at least a silicone-based surfactant, colloidal silica, an electrolyte salt, and an organic solvent, and an electrolytic capacitor using the electrolysis solution. Containing the silicone-based surfactant makes it possible to prevent charge balance of the colloidal silica from being lost.

6 Claims, No Drawings

ELECTROLYSIS SOLUTION FOR ELECTROLYTIC CAPACITOR, AND ELECTROLYTIC CAPACITOR

TECHNICAL FIELD

The present invention relates to an electrolysis solution for an electrolytic capacitor, having high spark voltage and excellent electric conductivity and heat resistance to spark voltage, and further relates to an electrolytic capacitor using the electrolysis solution.

BACKGROUND ART

Conventionally, an electrolysis solution for an electrolytic capacitor obtained by dissolving organic acid, inorganic acid, or salts thereof as an electrolyte in an organic solvent has been used.

Among electrolysis solutions, development of an electrolysis solution for an electrolytic capacitor, which has high electric conductivity and spark voltage, has been carried out actively because electric conductivity is directly related to loss in an electrolytic capacitor, impedance properties, and the like.

As disclosed in Patent Literature 1, as additives for improving spark voltage, for example, sulfamic acid, suberic acid, dodecyl phosphate, porous polyimide, and the like are known. All of these additives have excellent initial spark voltage but soon deteriorate during use, and therefore have a problem of poor heat resistance.

Patent Literature 2 discloses technology in which spark voltage is improved by using colloidal silica as inorganic oxidized colloidal particles in order to improve spark voltage while high electric conductivity is maintained. While an electrolysis solution containing colloidal silica has high initial spark voltage, the electrolysis solution has a problem in that it gels during use and short-circuits and thus has poor heat resistance.

As mentioned above, an electrolysis solution for an electrolytic capacitor having high spark voltage and excellent electric conductivity and heat resistance to spark voltage, and an electrolytic capacitor using the electrolysis solution, have been demanded.

PRIOR ART

Patent Literatures

[Patent Literature 1] Japanese Unexamined Patent Application, Publication No. 2009-283581
[Patent Literature 2] Japanese Unexamined Patent Application, Publication No. H05-6839

SUMMARY OF INVENTION

Technical Problem

An object of the present invention is to provide an electrolysis solution for an electrolytic capacitor having high spark voltage and excellent electric conductivity and heat resistance to spark voltage, and an electrolytic capacitor using the electrolysis solution.

Solution to Problem

The present invention provides an electrolysis solution for an electrolytic capacitor including at least a silicone surfactant, colloidal silica, an electrolyte salt, and an organic solvent, and an electrolytic capacitor using the electrolysis solution.

That it so say, the present invention provides the following.

A first invention is an electrolysis solution for an electrolytic capacitor, including at least a silicone surfactant, colloidal silica, an electrolyte salt, and an organic solvent.

A second invention is the electrolysis solution for an electrolytic capacitor as defined in the first invention, wherein a ratio by mass of the silicone surfactant to the colloidal silica is 0.01 to 10.

A third invention is the electrolysis solution for an electrolytic capacitor as defined in the first or second invention, wherein the silicone surfactant is polyether-modified silicone.

A fourth invention is the electrolysis solution for an electrolytic capacitor as defined in the third invention, wherein the polyether-modified silicone is a pendant-type polymer or an ABA-type polymer.

A fifth invention is the electrolysis solution for an electrolytic capacitor as defined in any one of the first to fourth inventions, wherein a content of the silicone surfactant in the electrolysis solution for an electrolytic capacitor is 0.01 to 20 mass %.

A sixth invention is the electrolysis solution for an electrolytic capacitor as defined in any one of the first to fifth inventions, wherein the electrolyte salt is any one of compounds represented by general formulae (1) to (5):

[Chem. 1]

(1)

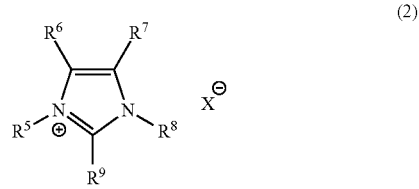

(2)

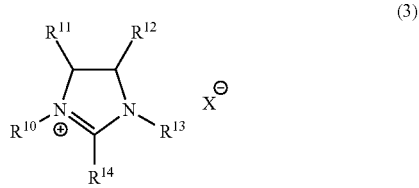

(3)

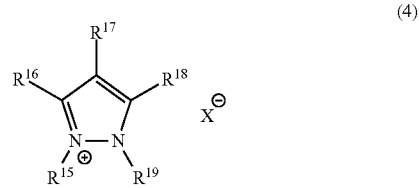

(4)

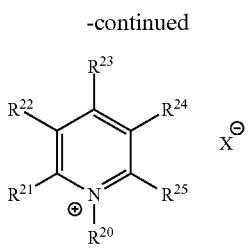
(5)

(wherein in the formulae (1) to (5), groups $R^1$ to $R^{25}$ represent hydrogen, an alkyl group having 1 to 18 carbon atoms, an alkoxy group having 1 to 18 carbon atoms, or a hydroxyl group, which may be the same as or different from each other; adjacent groups among $R^1$ to $R^{25}$ may be linked together to form an alkylene group having 2 to 6 carbon atoms; and $X^-$ represents a carboxylic acid anion or a boron compound anion).

A seventh invention is the electrolysis solution for an electrolytic capacitor as defined in any one of the first to sixth inventions, further including a defoaming agent containing at least one selected from the group consisting of an acetylene compound and polyglycol.

An eighth invention is an electrolytic capacitor using an electrolysis solution for an electrolytic capacitor as defined in the first to seventh inventions.

Advantageous Effects of Invention

The present invention can achieve an electrolysis solution for an electrolytic capacitor having high spark voltage, excellent electric conductivity and heat resistance to spark voltage, as well as an electrolytic capacitor using the electrolysis solution.

DESCRIPTION OF EMBODIMENTS

An electrolysis solution for an electrolytic capacitor in accordance with the present invention will be described.

The present inventors have extensively studied and have found that the above-mentioned problem can be solved by an electrolysis solution for an electrolytic capacitor including at least a silicone surfactant, colloidal silica, an electrolyte salt, and an organic solvent, as well as an electrolytic capacitor using the electrolysis solution, and have completed the present invention.
<Silicone Surfactant>

A silicone surfactant includes a compound having a siloxane bond (Si—O—Si) as a main skeleton and also has a Si—C bond. Specific examples of the silicone surfactant include dimethyl silicone, methyl phenyl silicone, chlorophenyl silicone, alkyl-modified silicone, fluorine-modified silicone, amino-modified silicone, alcohol-modified silicone, phenol-modified silicone, carboxy-modified silicone, epoxy-modified silicone, fatty acid ester-modified silicone, polyether-modified silicone, and the like.

The molecular weight of the silicone surfactant is preferably, for example, 100 to 100000. Use of a silicone surfactant having a molecular weight in this range can prevent charge balance of the colloidal silica from being lost. Consequently, gelation does not occur for a long period of time. Therefore, an electrolysis solution for an electrolytic capacitor having high spark voltage and excellent heat resistance can be obtained.

The alkyl-modified silicone is a modified silicone having an alkyl group having 6 or more carbon atoms, a 2-phenyl propyl group, or the like. The alcohol-modified silicone is a modified silicone having an alcoholic hydroxyl group. The epoxy-modified silicone is a modified silicone having a glycidyl group, an alicyclic epoxy group, or the like. The amino-modified silicone is a modified silicone having an amino group such as an amino propyl group and an N-(2-aminoethyl)aminopropyl group. The fatty acid ester silicone is a modified silicone having an ester group of fatty acid. The polyether-modified silicone is a modified silicone having a polyoxy alkylene group (for example, a polyoxy ethylene group, a polyoxypropylene group, a polyoxyethylene oxypropylene group, and the like).

The silicone surfactant can be used singly or in combination of two or more thereof. Among them, from the viewpoint that gelation of the electrolysis solution is prevented, polyether-modified silicone is particularly preferable.

Examples of the polyether-modified silicone include a pendant-type polymer, an ABA-type polymer, an $(AB)_n$-type polymer, a branched type polymer, and the like. Among them, a pendant-type polymer or an ABA-type polymer is preferable.

The pendant type is typically a compound represented by general formula (A), and the ABA type is typically a compound represented by general formula (B).

[Chem. 2]

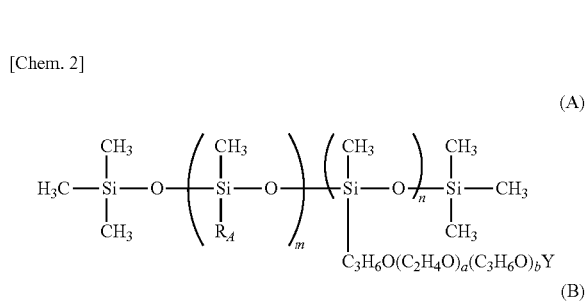

In the compounds represented by the above-mentioned general formulae (A) and (B), $R_A$ or $R_B$ represents an alkyl group having 1 to 20 carbon atoms; Y or Z represents a hydrogen atom or an alkyl group having 1 to 10 carbon atoms; m represents an integer of 0 to 1000; n or P represents an integer of 1 to 1000; and a, b, c, and d each independently represents an integer of 0 to 100.

Y or Z represents a hydrogen atom or an alkyl group having 1 to 10 carbon atoms. Preferably, Y or Z represents a hydrogen atom from the viewpoint of dispersibility.
<Electrolyte Salt>

An electrolyte salt used in the present invention may be any salt that is usually used in an electrolytic capacitor. Among the electrolyte salts, any of the compounds represented by the following general formulae (1) to (5) are preferably used as the electrolyte salt.

[Chem. 3]

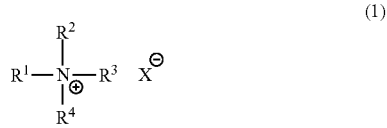
(1)

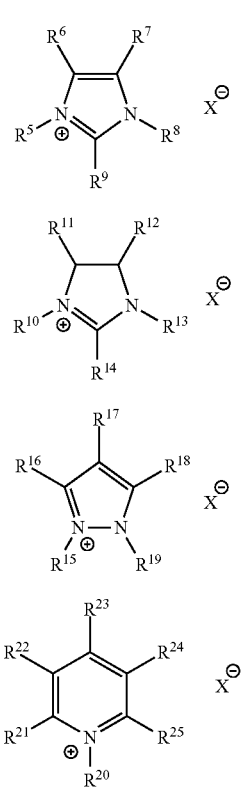

In the general formulae (1) to (5), groups $R^1$ to $R^{25}$ represent hydrogen, an alkyl group having 1 to 18 carbon atoms, an alkoxy group having 1 to 18 carbon atoms, or a hydroxyl group, which may be the same as or different from each other; adjacent groups among $R^1$ to $R^{25}$ may be linked together to form an alkylene group having 2 to 6 carbon atoms; and $X^-$ represents a carboxylic acid anion or a boron compound anion.

Specific examples of a cation moiety of the compound represented by the general formula (1) include ammonium cations; quaternary ammonium cations such as a tetramethylammonium cation, a tetraethyl ammonium cation, a tetrapropyl ammonium cation, a tetraisopropyl ammonium cation, a tetrabutyl ammonium cation, a trimethyl ethyl ammonium cation, a triethyl methyl ammonium cation, a dimethyl diethyl ammonium cation, a dimethyl ethyl methoxy ethyl ammonium cation, a dimethyl ethyl methoxy methyl ammonium cation, a dimethyl ethyl ethoxy ethyl ammonium cation, a trimethyl propyl ammonium cation, a dimethyl ethyl propyl ammonium cation, a triethyl propyl ammonium cation, a spiro-(1,1')-pyrrolidinium cation, a piperidine-1-spiro-1'-pyrrolidinium cation, and a spiro-(1,1')-bipiperidinium cation; tertiary ammonium cations such as a trimethylamine cation, a triethylamine cation, a tripropylamine cation, a triisopropyl amine cation, a tributylamine cation, a diethyl methyl amine cation, a dimethyl ethyl amine cation, a diethyl methoxy amine cation, a dimethyl methoxy amine cation, a dimethyl ethoxy amine cation, a diethyl ethoxy amine cation, a methyl ethyl methoxy amine cation, an N-methyl pyrrolidine cation, an N-ethyl pyrrolidine cation, an N-propyl pyrrolidine cation, an N-isopropyl pyrrolidine cation, an N-butyl pyrrolidine cation, an N-methyl piperidine cation, an N-ethyl piperidine cation, an N-propyl piperidine cation, an N-isopropyl piperidine cation, and an N-butyl piperidine cation; secondary ammonium cations such as a dimethylamine cation, a diethylamine cation, a diisopropylamine cation, a dipropylamine cation, a dibutylamine cation, a methyl ethyl amine cation, a methyl propyl amine cation, a methyl isopropyl amine cation, a methylbutyl amine cation, an ethyl isopropyl amine cation, an ethyl propyl amine cation, an ethyl butyl amine cation, an isopropyl butyl amine cation, and a pyrrolidine cation; and the like.

Among them, an ammonium cation, a tetraethyl ammonium cation, a triethyl methyl ammonium cation, a spiro-(1,1')-pyrrolidinium cation, an N-methyl pyrrolidine cation, a dimethyl ethyl amine cation, a diethyl methyl amine cation, a trimethylamine cation, a triethylamine cation, a diethylamine cation, and the like, are preferably used because they have an excellent effect of improving the spark voltage and/or the electric conductivity, and improving heat resistance.

Specific examples of the cation moiety of the compound represented by the general formula (2) include a tetramethyl imidazolium cation, a tetraethyl imidazolium cation, a tetrapropyl imidazolium cation, a tetraisopropyl imidazolium cation, a tetrabutyl imidazolium cation, a 1,3-dimethyl imidazolium cation, a 1,3-diethyl imidazolium cation, a 1,3-dipropyl imidazolium cation, a 1,3-diisopropyl imidazolium cation, a 1,3-dibutyl imidazolium cation, a 1-methyl-3-ethyl imidazolium cation, a 1-ethyl-3-methyl imidazolium cation, a 1-butyl-3-methyl imidazolium cation, a 1-butyl-3-ethyl imidazolium cation, a 1,2,3-trimethyl imidazolium cation, a 1,2,3-triethyl imidazolium cation, a 1,2,3-tripropyl imidazolium cation, a 1,2,3-triisopropyl imidazolium cation, a 1,2,3-tirbutyl imidazolium cation, a 1,3-dimethyl-2-ethyl imidazolium cation, a 1,2-dimethyl-3-ethyl imidazolium cation, and the like. Among them, a tetramethyl imidazolium cation, a tetraethyl imidazolium cation, a 1,3-dimethyl imidazolium cation, a 1,3-diethyl imidazolium cation, a 1-ethyl-3-methyl imidazolium cation, and the like, are preferably used because they have high electric conductivity and excellent improvement effect of heat resistance.

Specific examples of a cation moiety of the compound represented by the general formula (3) include a tetramethyl imidazolinium cation, a tetraethyl imidazolinium cation, a tetrapropyl imidazolinium cation, a tetraisopropyl imidazolinium cation, a tetrabutyl imidazolinium cation, a 1,3,4-trimethyl-2-ethyl imidazolinium cation, a 1,3-dimethyl-2,4-diethyl imidazolinium cation, a 1,2-dimethyl-3,4-diethyl imidazolinium cation, a 1-methyl-2,3,4-triethyl imidazolinium cation, a 1,2,3-trimethyl imidazolinium cation, a 1,2,3-triethyl imidazolinium cation, a 1,2,3-tripropyl imidazolinium cation, a 1,2,3-triisopropyl imidazolinium cation, a 1,2,3-tributyl imidazolinium cation, a 1,3-dimethyl-2-ethyl imidazolinium cation, a 1-ethyl-2,3-dimethyl imidazolinium cation, a 4-cyano-1,2,3-trimethyl imidazolinium cation, a 3-cyanomethyl-1,2-dimethyl imidazolinium cation, a 2-cyanomethyl-1,3-dimethyl imidazolinium cation, a 4-acetyl-1,2,3-trimethyl imidazolinium cation, a 3-acetyl methyl-1,2-dimethyl imidazolinium cation, a 4-methyl carboxymethyl-1,2,3-trimethyl imidazolinium cation, a 3-methyl carboxymethyl-1,2-dimethyl imidazolinium cation, a 4-methoxy-1,2,3-trimethyl imidazolinium cation, a 3-methoxy methyl-1,2-dimethyl imidazolinium cation, a 4-formyl-1,2,3-trimethyl imidazolinium cation, a 3-formyl methyl-1,2-dimethyl imidazolinium cation, a 3-hydroxyethyl-1,2-dimethyl imidazolinium cation, 4-hydroxymethyl-1,2,3-trimethyl imidazolinium cation, a 2-hydroxyethyl-1,3-dimethyl imidazolinium cation, and the like. Among them, a tetramethyl imidazolinium cation, a tetraethyl imidazolinium cation, a 1,2,3-trimethyl imidazolinium cation, a 1,2,3-triethyl imidazolinium cation, and a 1-ethyl-3-methyl imidazolinium cation are preferably used because they have high electric conductivity and are excellent in improvement effect of heat resistance.

Specific examples of a cation moiety of the compound represented by the general formula (4) include a tetramethyl pyrazolium cation, a tetraethyl pyrazolium cation, a tetrapropyl pyrazolium cation, a tetraisopropyl pyrazolium cation, a tetrabutyl pyrazolium cation, a 1,2-dimethyl pyrazolium cation, a 1-methyl-2-ethyl pyrazolium cation, a 1,2-diethyl pyrazolium cation, a 1,2-dipropyl pyrazolium cation, a 1,2-dibutyl pyrazolium cation, a 1-methyl-2-propyl pyrazolium cation, a 1-methyl-2-butyl pyrazolium cation, a 1-methyl-2-hexyl pyrazolium cation, a 1-methyl-2-octyl pyrazolium cation, a 1-methyl-2-dodecyl pyrazolium cation, a 1,2,3-trimethyl pyrazolium cation, a 1,2,3-triethyl pyrazolium cation, a 1,2,3-tripropyl pyrazolium cation, a 1,2,3-triisopropyl pyrazolium cation, a 1,2,3-tributyl pyrazolium cation, a 1-ethyl-2,3,5-trimethyl pyrazolium cation, a 1-ethyl-3-methoxy-2,5-dimethyl pyrazolium cation, a 3-phenyl-1,2,5-trimethyl pyrazolium cation, a 3-methoxy-5-phenyl-1-ethyl-2-ethyl pyrazolium cation, a 1,2-tetramethylene-3,5-dimethyl pyrazolium cation, a 1,2-tetramethylene-3-phenyl-5-methyl pyrazolium cation, a 1,2-tetramethylene-3-methoxy-5-methyl pyrazolium cation, and the like. Among them, tetramethyl pyrazolium cation, a tetraethyl pyrazolium cation, a 1,2-dimethyl pyrazolium cation, a 1,2-diethyl pyrazolium cation, a 1-methyl-2-ethyl pyrazolium cation, because they have high electric conductivity and are excellent in improvement effect of heat resistance.

Specific examples of a cation moiety of the compound represented by the general formula (5) include an N-methyl pyridinium cation, an N-ethyl pyridinium cation, an N-propyl pyridinium cation, an N-isopropyl pyridinium cation, an N-butyl pyridinium cation, an N-hexyl pyridinium cation, an N-octyl pyridinium cation, an N-dodecyl pyridinium cation, an N-methyl-3-methyl pyridinium cation, an N-ethyl-3-methyl pyridinium cation, an N-propyl-3-methyl pyridinium cation, an N-butyl-3-methyl pyridinium cation, an N-butyl-4-methyl pyridinium cation, an N-butyl-4-ethyl pyridinium cation, and the like. Among them, an N-methyl pyridinium cation, an N-ethyl pyridinium cation, an N-butyl pyridinium cation, an N-butyl-3-methyl pyridinium cation, and the like, because they have high electric conductivity and are excellent in improvement effect of heat resistance.

Anion X$^-$ to be combined with the above-mentioned cation is a carboxylic acid anion or a boron compound anion. The carboxylic acid anion is an anion of organic carboxylic acid such as aromatic carboxylic acid and aliphatic carboxylic acid. The organic carboxylic acid may have a substituent group. Specific examples of the carboxylic acid anion include aromatic carboxylic acid anions such as a phthalic acid anion, a salicylic acid anion, an isophthalic acid anion, a terephthalic acid anion, a trimellitic acid anion, a pyromellitic acid anion, a benzoic acid anion, a resorcylic acid, a cinnamic acid anion, a naphthoic acid anion, and a mandelic acid anion; aliphatic carboxylic acid anions including saturated carboxylic acid anions such as an oxalic acid anion, a malonic acid anion, a succinic acid anion, a glutaric acid anion, an adipic acid anion, a pimelic acid anion, suberic acid anion, an azelaic acid anion, a sebacic acid anion, an undecanoic diacid anion, a dodecanoic diacid anion, a tridecanoic diacid anion, a tetradecanoic diacid anion, a pentadecanoic diacid anion, a hexadecanoic diacid anion, a 3-tert-butyl adipic acid anion, a methyl malonic acid anion, an ethyl malonic acid anion, a propyl malonic acid anion, a butyl malonic acid anion, a pentyl malonic acid anion, a hexyl malonic acid anion, a dimethyl malonic acid anion, a diethyl malonic acid anion, a methyl propyl malonic acid anion, a methylbutyl malonic acid anion, an ethyl propyl malonic acid anion, a dipropyl malonic acid anion, a methyl succinic acid anion, an ethyl succinic acid anion, a 2,2-dimethyl succinic acid anion, a 2,3-dimethyl succinic acid anion, a 2-methyl glutaric acid anion, a 3-methyl glutaric acid anion, a 3-methyl-3-ethyl glutaric acid anion, a 3,3-diethyl glutaric acid anion, a methyl succinic acid anion, a 2-methyl glutaric acid anion, a 3-methyl glutaric acid anion, a 3,3-dimethyl glutaric acid anion, a 3-methyl adipic acid anion, a 1,6-decanedicarboxylic acid anion, a 5,6-decanedicarboxylic acid anion, a formic acid anion, an acetic acid anion, a propionic acid anion, butyric acid anion, an isobutyric acid anion, a valeric acid anion, a caproic acid anion, an enanthic acid anion, a caprylic acid anion, a pelargonic acid anion, a laurylic acid anion, a myristic acid anion, a stearic acid anion, a behenic acid anion, an undecanoic acid anion, a boric acid anion, a borodiglycolic acid anion, a borodioxalic acid anion, a borodisalicylic acid anion, a borodiazelaic acid anion, a borodilactic acid, an itaconic acid anion, a tartaric acid anion, a glycolic acid anion, a lactic acid anion, and a pyruvic acid anion, and aliphatic carboxylic acid anions containing an unsaturated carboxylic acid such as a maleic acid anion, a fumaric acid anion, an acrylic acid anion, a methacrylic acid anion, and an oleic acid anion. These may be used singly or in combination of two or more thereof. Among them, a phthalic acid anion, a maleic acid anion, a salicylic acid anion, a benzoic acid anion, an adipic acid anion, a sebacic acid anion, an azelaic acid anion, a 1,6-decanedicarboxylic acid anion, a 3-tert-butyl adipic acid anion, and the like, are preferable because they have the improved spark voltage and are thermally stable.

Examples of the boron compound anion include a boric acid anion, a borodiazelaic acid anion, a borodisalicylic acid anion, a borodiglycolic acid anion, a borodilactic acid anion, a borodioxalic acid anion, and the like. Among them, a boric acid anion, a borodisalicylic acid anion, a borodiglycolic acid anion, and the like, are preferably used because they are excellent in the spark voltage.

Among the above-mentioned anions, in the case where they are used for low-voltage/middle-voltage electrolytic capacitor, a phthalic acid anion, a maleic acid anion, a salicylic acid anion, a benzoic acid anion, an adipic acid anion, a borodisalicylic acid anion, a borodiglycolic acid anion, and the like, are preferably used. Thus, high electric conductivity and excellent heat resistance are obtained. On the other hand, in use for a high-voltage electrolytic capacitor, a sebacic acid anion, an azelaic acid anion, a 1,6-decanedicarboxylic acid anion, a 3-tert-butyl adipic acid anion, a boric acid anion, a borodisalicylic acid anion, a borodiglycolic acid anion, and the like, are preferably used. Thus, excellent effect can be obtained in terms of the spark voltage and heat resistance.

In the compounds represented by the above-mentioned general formulae (1) to (5), the compounds represented by the general formulae (1) to (3) are preferably used because they are stable for a long period of time, can achieve high spark voltage, and are excellent in heat resistance. Specific examples of the electrolyte salts to be used for low-voltage/middle voltage electrolytic capacitors include dimethylethylamine maleate, dimethylethylamine phthalate, tetraethylammonium maleate, tetraethylammonium phthalate, trimethylamine maleate, trimethylamine phthalate, triethylamine maleate, triethylamine phthalate, diethylamine maleate, diethylamine phthalate, spiro-(1,1')-bipyrrolidinium maleate, spiro-(1,1')-bipyrrolidinium phthalate, 1-ethyl-3-methyl imidazolium maleate, 1-ethyl-3-methyl imidazolium phthalate, 1-ethyl-3-methyl imidazolinium maleate, 1-ethyl-3-methyl imidazolinium phthalate, tetramethyl imidazolium phthalate, tetramethyl imidazolinium phthalate, tetraethyl imidazolium phthalate, tetraethyl imidazolinium phthalate, and the like. On the other hand, examples of the electrolyte salts to be used for high-voltage electrolytic capacitors include dimethylamine sebacate, diethylamine sebacate, trimethylamine sebacate, triethylamine sebacate, ammonium sebacate, dimethylamine azelate, diethylamine azelate, trimethylamine azelate, triethylamine azelate, ammonium azelate, ammonium 1,6-decanedicarboxylate, dimethylamine 1,6-decanedicarboxylate, diethylamine 1,6-decanedicarboxylate, trimethylamine 1,6-decanedicarboxylate, triethylamine 1,6-decanedicarboxylate, N-methyl pyrrolidine borodisalicylate, and the like.

The content of electrolyte salt in the electrolysis solution for an electrolytic capacitor is preferably 1.0 to 60 mass %, more preferably 5.0 to 50 mass %, and particularly preferably 10 to 40 mass %.

A content of less than 1.0 mass % has the problem that sufficient electrical characteristic cannot be obtained, and the content of more than 60 mass % has the problem that the specific resistance is increased.

<Colloidal Silica>

The colloidal silica is a colloid of $SiO_2$ or hydrate thereof, which has a particle diameter of 1 to 300 nm and which does not have a certain structure. The colloidal silica can be obtained by allowing dilute hydrochloric acid to act on silicate, followed by carrying out dialysis. The smaller the particle diameter is, the more easily gelation proceeds. However, the larger the particle diameter is, the less easily gelation occurs. The particle diameter of the colloidal silica used in the present invention is preferably 10 to 50 nm, and more preferably 10 to 30 nm. When the colloidal silica having the particle diameter in this range is used, gelation does not easily occur, and a stable dispersion state can be maintained even when the electrolytic capacitor is used.

The colloidal silica is hardly dissolves in water or an organic solvent. In general, the colloidal silica is dispersed in an appropriate dispersive medium to form a colloid liquid, and the colloid liquid is added to an electrolysis solution. Thus, the colloidal silica can be used in a dispersion state even when the electrolytic capacitor is used.

The colloidal silica used in the present invention may be sodium-stabilized type colloidal silica, or acidic colloidal silica, or ammonium-stabilized type colloidal silica.

In the sodium-stabilized type colloidal silica, the surface of colloidal silica is an ONa group. In the acidic colloidal silica, the surface of colloidal silica is an OH group from which Na has been removed. In the ammonium stabilized type colloidal silica, Na has been removed to form an OH group, and then ammonium is added for stabilization.

Among them, acidic colloidal silica or ammonium-stabilized type colloidal silica having less content of sodium ion is preferred.

The content of the colloidal silica in the electrolysis solution for an electrolytic capacitor is 0.1 to 20 mass %, more preferably 0.2 to 15 mass %, and particularly preferably 0.3 to 10 mass %. The content of less than 0.1 mass % has a problem that improvement effect of the electrical characteristic in an electrolytic capacitor is small, and the content of more than 20 mass % has a problem in that viscosity is large to thus make handling difficult.

An average particle diameter of the colloidal silica is not particularly limited, and it is preferably 1 to 100 nm, more preferably 10 to 50 nm, and particularly preferably 10 to 30 nm. When the colloidal silica has the above-mentioned average particle diameter, it is possible to obtain an electrolysis solution for an electrolytic capacitor having excellent dispersibility in a solvent.

The shape of the colloidal silica may be any one of a sphere, a chain shape, an annular shape in which the colloidal silica is aggregated in an annular shape and dispersed in a solvent.

<Organic Solvent>

As an organic solvent used for an electrolysis solution for an electrolytic capacitor, a protic polar solvent or an aprotic polar solvent can be used. The solvent may be used singly or in combination two or more solvents.

Examples of the protic polar solvent include monohydric alcohols (methanol, ethanol, propanol, butanol, pentanol, hexanol, cyclobutanol, cyclopentanol, cyclohexanol benzyl alcohol, and the like), and polyvalent alcohols and oxyalcohol compounds (such as ethylene glycol, propylene glycol, glycerin, methyl cellosolve, ethyl cellosolve, methoxypropylene glycol, dimethoxy propanol, and the like).

Examples of the aprotic polar solvent include γ-butyrolactone, γ-valerolactone, amide (for example, N-methylformamide, N,N-dimethylformamide, N-ethyl formamide, N,N-diethylformamide, N-methyl acetamide, N,N-dimethyl acetamide, N-ethyl acetamide, N,N-diethyl acetamide, and hexamethylphosphoric amide); sulfolane (for example, sulfolane, 3-methyl sulfolane, and 2,4-dimethyl sulfolane); chain sulfones (for example, dimethyl sulfone, ethyl methyl sulfone, and ethyl isopropyl sulfone), cyclic amides (for example, N-methyl-2-pyrrolidone); carbonates (for example, ethylene carbonate, propylene carbonate, and isobutylene carbonate); nitriles (for example, acetonitrile); sulfoxides (for example, dimethyl sulfoxide); 2-imidazolidinones [for example, 1,3-dialkyl-2-imidazolidinone (for example, 1,3-dimethyl-2-imidazolidinone, 1,3-diethyl-2-imidazolidinone, and 1,3-di(n-propyl)-2-imidazolidinone); and 1,3,4-trialkyl-2-imidazolidinone (for example, 1,3,4-trimethyl-2-imidazolidinone)], and the like.

When the solvent is used for low-voltage/middle-voltage electrolytic capacitors, a solvent including γ-butyrolactone as a main solvent is preferably used. Furthermore, the content of water contained in the electrolysis solution for an electrolytic capacitor is preferably smaller. When the solvent is used for high voltage electrolytic capacitor, ethylene glycol is preferable. Furthermore, the content of water contained in the electrolysis solution for an electrolytic capacitor is not particularly limited but it is preferably 0.1 to 30 mass %, and more preferably 0.5 to 20 mass %. This amount of water enables excellent electric conductivity to be obtained.

The content of the silicone surfactant contained in the electrolysis solution for an electrolytic capacitor is preferably 0.01 to 20 mass %, more preferably 0.05 to 15 mass %, and particularly preferably 0.1 to 10 mass %. When the content is less than 0.01 mass %, an effect of preventing aggregation of colloidal silica cannot sufficiently be obtained. When the content is more than 20 mass %, the electric conductivity in the electrolysis solution may be somewhat reduced.

The content ratio (ratio by mass) of the colloidal silica to the silicone surfactant in the electrolysis solution for an electrolytic capacitor may be any ratio by mass, but preferably the content ratio of the colloidal silica to the silicone surfactant is preferably 1:0.01 to 10, more preferably 1:0.05 to 5.0, and particularly preferably 1:0.1 to 2.0. The content ratio is set at this range, it is possible to prevent the electrolysis solution from being gelled, so that more excellent heat resistance can be achieved.

When the silicone surfactant is contained in the electrolysis solution for an electrolytic capacitor, it is possible to prevent gelation caused by colloidal silica at the time of heating, storage, or use. Thus, it is possible to maintain excellent electric conductivity and spark voltage for a long period of time.

<Defoaming Agent>

According to the present invention, the electrolysis solution for an electrolytic capacitor may contain a defoaming agent. Any defoaming agents capable of suppressing foaming of an electrolysis solution with a silicone surfactant added can be used. Specific examples of the defoaming agent containing an acetylene compound include SURFYNOL 104E, DF-75, and MD-20, OLFIN E1004, E1010, E1020, PD-001, PD-002W, PD-004, PD-005, EXP4001, EXP4200, EXP4123, EXP4300, WE-003, P-10PG, AF-103, and SK-14, all of which are manufactured by Nissin Chemical Co., Ltd; examples of a defoaming agent containing polyglycol include BYK-018, BYK-021, BYK-022, BYK-024, BYK-028, BYK-093, and BYK-1730, all of which are manufactured by BYK-Chemie; SN Defoamer 170, 260, manufactured by SAN NOPCO, and the like.

When the defoaming agent contains the electrolysis solution for an electrolytic capacitor, a part of foam of the silicone surfactant is replaced by a defoaming agent so as to prevent generation of foam. Consequently, when an electrolytic capacitor is impregnated with an electrolysis solution, the electrolysis solution can be uniformly placed into the further inner side of a separator. Therefore, when the electrolytic capacitor is operated, colloidal silica can act more uniformly by electrode foil, and an electrolytic capacitor having higher withstand voltage can be manufactured.

The content ratio (ratio by mass) of the silicone surfactant to the defoaming agent in the electrolysis solution for an electrolytic capacitor may be an arbitrary ratio by mass, but the ratio of the silicone surfactant to the defoaming agent is preferably 1:0.001 to 3.0, more preferably 1:0.005 to 1.5, and particularly preferably 1:0.01 to 0.5.

The content of a defoaming agent in the electrolysis solution for an electrolytic capacitor is preferably 0.001 to 10 mass %, and more preferably 0.01 to 5 mass %.

<Other Additives>

The electrolysis solution for an electrolytic capacitor of the present invention may contain additives other than the above. Examples of such additives include polyvinyl alcohol, phosphoric acid compounds such as dibutyl phosphoric acid and phosphorous acid; boron compounds such as boric acid, Mannit, a complex of boric acid with Mannit or Sorbit, a complex of boric acid with polyhydric alcohol such as ethylene glycol and glycerin; and nitro compounds such as o-nitrobenzoic acid, m-nitrobenzoic acid, p-nitrobenzoic acid, o-nitrophenol, m-nitrophenol, p-nitrophenol, and the like.

An addition amount is preferably 0.1 to 10 mass %, and more preferably 0.5 to 5.0 mass %. The addition amount of less than 0.1 mass % has a problem that sufficient spark voltage cannot be obtained. The addition amount of more than 10 mass % has a problem that electric conductivity is reduced.

<Electrolytic Capacitor>

The electrolytic capacitor of the present invention contains the above-mentioned electrolysis solution for an electrolytic capacitor.

An electrolytic capacitor of the present invention is described taken an aluminum electrolytic capacitor as an example. The aluminum electrolytic capacitor is an electrolytic capacitor formed by using a chemical conversion foil formed as a dielectric body as an oxide coating by subjecting the surface of aluminum foil to anodic oxidation treatment for the anode side electrode, and disposing a cathode side electrode to face the anode side electrode with a separator interposed therebetween, and allowing an electrolysis solution to be held therein.

As performance required for an electrolysis solution for middle-voltage/low-voltage electrolytic capacitors, the electric conductivity after heat resistance test (105° C., 2000 hours) is preferably 7.0 mS/cm or more, more preferably 7.3 mS/cm or more, further more preferably 7.7 mS/cm or more, and particularly preferably 8 mS/cm or more. The spark voltage after the heat resistance test (105° C., 2000 hours) is preferably 200 V or more, more preferably 205 V or more, further more preferably 210 V or more, and particularly preferably 215 V or more. As performance required for a middle-voltage/low-voltage electrolytic capacitor, the withstand voltage is preferably 200 V or more, more preferably 210 V or more, further more preferably 220 V or more, further preferably 230 V or more, and particularly preferably 250 V or more. The withstand voltage can be measured by the measurement method described in Examples, for example.

As performance required for an electrolysis solution for a high-voltage electrolytic capacitor, the electric conductivity after heat resistance test (105° C., 2000 hours) is preferably 2.0 mS/cm or more, more preferably 2.3 mS/cm or more, further more preferably 2.7 mS/cm or more, and particularly preferably 3 mS/cm or more. The spark voltage after the heat resistance test (105° C., 2000 hours) is preferably 550 V or more, more preferably 555 V or more, further more preferably 560 V or more, and particularly preferably 565 V or more. As performance required for a high-voltage electrolytic capacitor, the withstand voltage is preferably 550 V or more, more preferably 560 V or more, further more preferably 570 V or more, further preferably 580 V or more, and particularly preferably 595 V or more. The withstand voltage can be obtained by the measurement method described in Examples, for example.

In general, an electrolytic capacitor using an electrolysis solution containing an electrolyte salt and colloidal silica is excellent in the initial spark voltage, but has the problem that performance may deteriorate. The cause of deterioration of the spark voltage is because electric charge balance of the colloidal silica is lost due to containing of electrolyte salt, and then the colloidal silica is aggregated or/and polymerized when the electrolytic capacitor is used. As a result, an electrolysis solution is gelled, thus deteriorating heat resistance.

When a silicone surfactant to be used in the present invention is contained, it is possible to prevent the electric charge balance of the colloidal silica from being lost, and aggregation does not easily occur. Consequently, gelation can be prevented. As a result, it is possible to produce an electrolysis solution for an electrolytic capacitor, which is excellent in initial spark voltage and has excellent electric conductivity and excellent heat resistance in spark voltage, and an electrolytic capacitor using the electrolysis solution.

EXAMPLES

Hereinafter, the present invention will be described by Examples. It should not be construed that the present invention is not limited to Examples. The term "part" denotes "part by mass" and "%" denotes "mass %."

Examples 1 to 15 and Comparative Examples 1 to 7

Firstly, production examples of middle-voltage/low-voltage electrolytic capacitor and an electrolysis solution used for the electrolytic capacitor are described.

166 parts of phthalic acid and 530 parts of γ-butyrolactone as a solvent were mixed and stirred while 73.1 parts of N,N-dimethyl ethyl amine was dropped so as to obtain a dimethylethylamine phthalate solution. Then, 40.0 parts of colloidal silica (Snowtex N-40, manufactured by Nissan Chemical Industries, Ltd., aqueous dispersion, solid content: 40%, average particle diameter: 20 to 30 nm, pH 9.0 to 10), and the below-mentioned surfactant and/or a defoaming agent were added to the above-obtained solution and mixed thereof. Then the mixture was concentrated at 80° C. to obtain an electrolysis solution for an electrolytic capacitor.

Types and amounts of surfactant and defoaming agent used in each Example and Comparative Example are described in the following. Numeric values in parentheses show the ratio by mass of the surfactant normalized when the mass of the colloidal silica (solid content) is defined as 1, and the ratio by mass of the defoaming agent normalized when the mass of the surfactant is defined as 1.

Details of the additives and defoaming agents are as follows.

"pendant-type"=polyether-modified silicone (pendant-type): "Silwet L-7657" manufactured by Momentive, molecular weight: 5000

"ABA type"=polyether-modified silicone (ABA type): "Silwet L-8500" manufactured by Momentive, molecular weight: 2800

"amino modified"=amino-modified silicone: "XF42-B1989" manufactured by Momentive, molecular weight: 20000

"alcohol modified"=alcohol-modified silicone: "XF3905" manufactured by Momentive, molecular weight: 25000 sodium hexametaphosphate: manufactured by ALDRICH polyethylene glycol (molecular weight: 600): manufactured by Wako Pure Chemical Industries, Ltd.

polyethylene oxide (molecular weight: 100000): manufactured by Wako Pure Chemical Industries, Ltd.

"BYK": polyglycol-containing defoaming agent, "BYK-024" manufactured by BYK-Chemie;

|  | Surfactant (ratio by mass) | Defoaming agent (ratio by mass) |
| --- | --- | --- |
| Ex. 1: | pendant-type (0.01) | not contained |
| Ex. 2: | pendant-type (0.05) | not contained |
| Ex. 3: | pendant-type (0.1) | not contained |
| Ex. 4: | pendant-type (0.5) | not contained |
| Ex. 5: | pendant-type (1.0) | not contained |
| Ex. 6: | pendant-type (2.0) | not contained |
| Ex. 7: | pendant-type (3.0) | not contained |
| Ex. 8: | pendant-type (5.0) | not contained |
| Ex. 9: | pendant-type (8.0) | not contained |
| Ex. 10: | pendant-type (10.0) | not contained |
| Ex. 11: | pendant-type (11.0) | not contained |
| Ex. 12: | ABA-type (0.5) | not contained |
| Ex. 13: | amino-modified (0.5) | not contained |
| Ex. 14: | alcohol-modified (0.5) | not contained |
| Ex. 15: | pendant-type (0.5) | BYK (0.1) |
| Co. Ex. 1*: | not contained | not contained |
| Co. Ex. 2: | not contained | not contained |
| Co. Ex. 3*: | pendant-type (0.5) | not contained |
| Co. Ex. 4*: | not contained | BYK (0.1) |
| Co. Ex. 5: | sodium hexametaphosphate (0.5) | not contained |
| Co. Ex. 6: | polyethylene glycol having a molecular weight of 600 (0.5) | not contained |
| Co. Ex. 7: | polyethylene oxide having a molecular weight of 100000 (0.5) | not contained |

(Ex = Example, Co Ex = Comparative Example)

(*) In Comparative Examples 1, 3, and 4, colloidal silica was not added. In this case, the "additive amount" of the surfactant and the defoaming agent are represented by the ratio thereof to the amount of colloidal silica assuming that the colloidal silica was added equally in the above.

<Production of Electrolytic Capacitor>

Electrolytic capacitors were produced by using the above-mentioned electrolysis solutions. Firstly, a capacitor element was formed by winding an anode foil and a cathode foil with a separator interposed therebetween. An anode tab and a cathode tab were connected to the anode foil and the cathode foil, respectively. The anode tab and the cathode tab were made of aluminum with high purity, and formed of a flat portion connected to each foil and a round-bar portion continuing to the flat portion. To the round-bar portion, anode lead wire and cathode lead wire were connected. Note here that each foil and electrode tab was connected by stitch.

The thus configured capacitor element was impregnated with each of the above-mentioned electrolysis solutions for an electrolytic capacitor. The capacitor element impregnated with an electrolysis solution was housed in a bottomed cylindrical exterior case made of aluminum, sealing body made of butyl rubber and having a through-hole for leading out a lead wire into an opening end of the exterior case is inserted, followed by sealing the electrolytic capacitor by caulking the end portion of the exterior case so as to obtain an aluminum electrolytic capacitor. Specifications of aluminum electrolytic capacitor elements using electrolysis solutions of the above-mentioned Examples 1 to 15 and Comparative Examples 1 to 7 include rated voltage of 250 V and rated capacitance of 47 μF.

The electrolysis solution for an electrolytic capacitor and the electrolytic capacitor were evaluated as follows.

(Evaluation Method of Electric Conductivity)

In the evaluation method of the electric conductivity, electric conductivity of the electrolysis solution for an electrolytic capacitor at 30° C. was measured by using SC meter SC72 manufactured by Yokogawa Electric Corporation. As the heat resistance, electric conductivity was measured after 2000 hours has passed at a temperature of 105° C.

(Evaluation Method of Spark Voltage)

An evaluation method of spark voltage was carried out by applying a constant current of 5 mA/cm$^2$ to an electrolysis solution for an electrolytic capacitor at 25° C., and examining a voltage-time curve. A voltage at which spark or scintillation was observed for the first time in the voltage ascending curve was defined as spark voltage (V). As the heat resistance, spark voltage was measured after 2000 hours has passed at a temperature of 105° C.

As for the electrolytic capacitor, electric current of 5 mA/cm$^2$ and voltage of 350 V were respectively applied at a temperature of 105° C. A value of a voltage at which a spark or scintillation was observed for the first time in the voltage-time ascending curve was recorded as withstand voltage.

The measurement results of the above-mentioned evaluation in Examples and Comparative Examples are summarized. The electric conductivity (mS/cm) and the spark voltage (V) were described in parentheses (initial value and value after 2000-hour test). Withstand voltages (V) were results of the above-mentioned tests in the electrolytic capacitor.

|  | Electric conductivity (initial value and value after test) | Spark voltage (initial value and value after test) | Withstand voltage |
| --- | --- | --- | --- |
| Ex. 1: | (8.1, 7.6) | (208, 206) | 215 |
| Ex. 2: | (8.1, 7.9) | (213, 212) | 228 |
| Ex. 3: | (8.1, 8.1) | (218, 218) | 236 |
| Ex. 4: | (8.1, 8.1) | (218, 218) | 237 |
| Ex. 5 | (8.1, 8.1) | (218, 218) | 238 |
| Ex. 6: | (8.1, 8.1) | (218, 218) | 237 |
| Ex. 7: | (8.1, 7.9) | (214, 213) | 228 |
| Ex. 8: | (8.1, 7.8) | (213, 212) | 223 |
| Ex. 9: | (8.1, 7.6) | (208, 206) | 216 |
| Ex. 10: | (8.1, 7.5) | (208, 206) | 214 |
| Ex. 11: | (8.1, 7.2) | (204, 201) | 205 |
| Ex. 12: | (8.1, 8.1) | (218, 218) | 237 |
| Ex. 13: | (8.1, 7.9) | (217, 215) | 233 |
| Ex. 14: | (8.1, 7.9) | (217, 215) | 233 |
| Ex. 15: | (8.1, 8.1) | (229, 229) | 256 |
| Co. Ex. 1: | (8.1, 8.1) | (100, 70) | 60 |
| Co. Ex. 2: | (8.1, 4.1) | (140, 85) | 75 |
| Co. Ex. 3: | (8.1, 8.1) | (105, 75) | 65 |
| Co. Ex. 4: | (8.1, 8.1) | (100, 70) | 60 |
| Co. Ex. 5: | (6.7, 4.2) | (125, 80) | 78 |
| Co. Ex. 6: | (6.7, 4.1) | (125, 80) | 76 |
| Co. Ex. 7: | (6.8, 4.4) | (122, 78) | 74 |

(Ex = Example, Co Ex = Comparative Example)

Based on Comparative Example 1 which does not contain any of colloidal silica, surfactant, and a defoaming agent, Comparative Example 2 containing only colloidal silica, and Comparative Example 3 containing only surfactant showed improvement of the spark voltage and the withstand voltage to some extent. However, Example 4 containing both the colloidal silica and the surfactant showed remarkable improvement of the spark voltage and the withstand voltage. Furthermore, also Example 15 containing a defoaming agent showed further improvement of the spark voltage and the withstand voltage. This shows contrast to Comparative Example 4, which does not contain colloidal silica and a surfactant but which contains a defoaming agent, does not show the improvement of the spark voltage and the withstand voltage.

Examples 16 to 30 and Comparative Examples 8 to 14

The below-mentioned production and evaluation methods are ones for a high-voltage electrolytic capacitor and an electrolysis solution for the same.

188 parts (1.0 mol) of azelaic acid and 1630 parts of ethylene glycol as solvent were mixed and stirred, while 146 parts (2.0 mol) of diethylamine was dropped thereto so as to obtain a diethylamine azelate solution in diethylamine ethylene glycol, 100 parts of colloidal silica (Snowtex N-40 manufactured by Nissan Chemical Industries, Ltd., aqueous dispersion, solid content: 40%, average particle diameter: 20 to 30 nm, pH 9.0 to 10), and the below-mentioned surfactant and/or defoaming agent were added and mixed thereto, and then concentrated at 80° C. to obtain an electrolysis solution for an electrolytic capacitor.

Types and amounts of the surfactant and the defoaming agent used in each Example and Comparative Example follow. Ways of description are the same as mentioned above.

|  | Surfactant (ratio by mass) | Defoaming agent (ratio by mass) |
| --- | --- | --- |
| Ex. 16: | pendant-type (0.01) | not contained |
| Ex. 17: | pendant-type (0.05) | not contained |
| Ex. 18: | pendant-type (0.1) | not contained |
| Ex. 19: | pendant-type (0.5) | not contained |
| Ex. 20: | pendant-type (1.0) | not contained |
| Ex. 21: | pendant-type (2.0) | not contained |
| Ex. 22: | pendant-type (3.0) | not contained |
| Ex. 23: | pendant-type (5.0) | not contained |
| Ex. 24: | pendant-type (8.0) | not contained |
| Ex. 25: | pendant-type (10.0) | not contained |
| Ex. 26: | pendant-type (11.0) | not contained |
| Ex. 27: | ABA type (0.5) | not contained |
| Ex. 28: | amino-modified (0.5) | not contained |
| Ex. 29: | alcohol-modified (0.5) | not contained |
| Ex. 30: | pendant-type (0.5) | BYK (0.1) |
| Co. Ex. 8*: | not contained | not contained |
| Co. Ex. 9: | not contained | not contained |
| Co. Ex. 10*: | pendant-type (0.5) | not contained |
| Co. Ex. 11*: | not contained | BYK (0.1) |
| Co. Ex. 12: | sodium hexametaphosphate (0.5) | not contained |
| Co. Ex. 13: | polyethylene glycol having a molecular weight of 600 (0.5) | not contained |
| Co. Ex. 14: | polyethylene oxide having a molecular weight of 100000 (0.5) | not contained |

(Ex = Example, Co Ex = Comparative Example)

(*) In Comparative Examples 8, 10, and 11, colloidal silica was not added. In this case, the "additive amount" of the surfactant and the defoaming agent are represented by the ratio thereof to the amount of colloidal silica assuming that the colloidal silica was added equally in the above.

<Production of Electrolytic Capacitor>

The aluminum electrolytic capacitor elements using the above-mentioned Examples 16 to 30 and Comparative Examples 8 to 17 were produced as mentioned above. Specifications of the aluminum electrolytic capacitor element include rated voltage of 500 V and rated capacitance of 350 µF.

The electrolysis solution for an electrolytic capacitor and the electrolytic capacitor were evaluated as follows.

The electric conductivity and the spark voltage were evaluated as mentioned above.

As for the electrolytic capacitor, electric current of 10 mA/cm$^2$ and voltage of 700 V were respectively applied at a temperature of 105° C. A value of a voltage at which a spark or scintillation was observed for the first time in the voltage-time ascending curve was recorded as withstand voltage.

The measurement results of the above-mentioned evaluation in Examples and Comparative Examples are summarized. The electric conductivity (mS/cm) and the spark voltage (V) were described in parentheses (initial value and value after 2000-hour test). Withstand voltages (V) were results of the above-mentioned tests in the electrolytic capacitor.

|  | Electric conductivity (initial value and value after test) | Spark voltage (initial value and value after test) | Withstand voltage |
| --- | --- | --- | --- |
| Ex. 16: | (3.2, 2.6) | (558, 555) | 566 |
| Ex. 17: | (3.2, 2.9) | (563, 561) | 575 |

-continued

|  | Electric conductivity (initial value and value after test) | Spark voltage (initial value and value after test) | Withstand voltage |
| --- | --- | --- | --- |
| Ex. 18: | (3.2, 3.2) | (568, 568) | 582 |
| Ex. 19: | (3.2, 3.2) | (568, 568) | 583 |
| Ex. 20: | (3.2, 3.2) | (568, 568) | 583 |
| Ex. 21: | (3.2, 3.2) | (568, 568) | 582 |
| Ex. 22: | (3.2, 2.9) | (564, 562) | 576 |
| Ex. 23: | (3.2, 2.8) | (563, 561) | 574 |
| Ex. 24: | (3.2, 2.6) | (559, 556) | 567 |
| Ex. 25: | (3.2, 2.4) | (558, 555) | 565 |
| Ex. 26: | (3.2, 2.2) | (554, 550) | 555 |
| Ex. 27: | (3.2, 3.2) | (568, 568) | 583 |
| Ex. 28: | (3.2, 3.1) | (567, 565) | 580 |
| Ex. 29: | (3.2, 3.1) | (567, 565) | 580 |
| Ex. 30: | (3.2, 3.2) | (579, 579) | 601 |
| Co. Ex. 8: | (3.2, 3.2) | (400, 230) | 230 |
| Co. Ex. 9: | (3.2, 1.5) | (420, 248) | 250 |
| Co. Ex. 10: | (3.2, 3.2) | (410, 240) | 240 |
| Co. Ex. 11: | (3.2, 3.2) | (400, 230) | 230 |
| Co. Ex. 12: | (1.8, 0.8) | (405, 234) | 240 |
| Co. Ex. 13: | (1.8, 0.8) | (405, 234) | 238 |
| Co. Ex. 14: | (1.7, 0.7) | (400, 231) | 235 |

(Ex = Example, Co Ex = Comparative Example)

Similar to the case of the above-mentioned middle-voltage/low-voltage electrolytic capacitors, also in the case of high-voltage electrolytic capacitors of Examples 16 to 30, Comparative Example 9 containing only colloidal silica, and Comparative Example 10 containing only surfactant showed slight improvement of improvement of the spark voltage and the withstand voltage with respect to Comparative Example 8 which does not contain any of colloidal silica and surfactant. However, Example 19 containing both the colloidal silica and the surfactant showed remarkable improvement of the spark voltage and the withstand voltage. In addition, also Example 30 containing a defoaming agent showed further improvement of the spark voltage and the withstand voltage. This shows contrast to Comparative Example 11, which does not contain colloidal silica and a surfactant but which contains a defoaming agent, does not show the improvement of the spark voltage and the withstand voltage.

INDUSTRIAL APPLICABILITY

An electrolysis solution for an electrolytic capacitor in accordance with the present invention has high spark voltage and excellent electric conductivity and heat resistance to spark voltage, and therefore can be applicable in a wide variety of industries.

The invention claimed is:

1. An electrolysis solution for an electrolytic capacitor, comprising at least a silicone surfactant, colloidal silica, an electrolyte salt, and an organic solvent, wherein a ratio by mass of the silicone surfactant to the colloidal silica is 0.01 to 10.

2. The electrolysis solution for an electrolytic capacitor according to claim 1, wherein the silicone surfactant is polyether-modified silicone.

3. The electrolysis solution for an electrolytic capacitor according to claim 1, wherein the silicone surfactant is polyether-modified silicone and is a pendant-type polymer or an ABA-type polymer.

4. An electrolysis solution for an electrolytic capacitor, comprising at least a silicone surfactant, colloidal silica, an electrolyte salt, and an organic solvent, wherein a content of the silicone surfactant in the electrolysis solution for an electrolytic capacitor is 0.01 to 20 mass %.

5. An electrolysis solution for an electrolytic capacitor, comprising at least a silicone surfactant, colloidal silica, an electrolyte salt, and an organic solvent, further comprising a defoaming agent containing at least one selected from the group consisting of an acetylene compound and polyglycol.

6. An electrolytic capacitor comprising an electrolysis solution for an electrolytic capacitor according to claim 1.

* * * * *